June 18, 1963   J. M. GWINN, JR   3,094,351
DUMP TRUCK BODY
Filed April 30, 1956   5 Sheets-Sheet 1
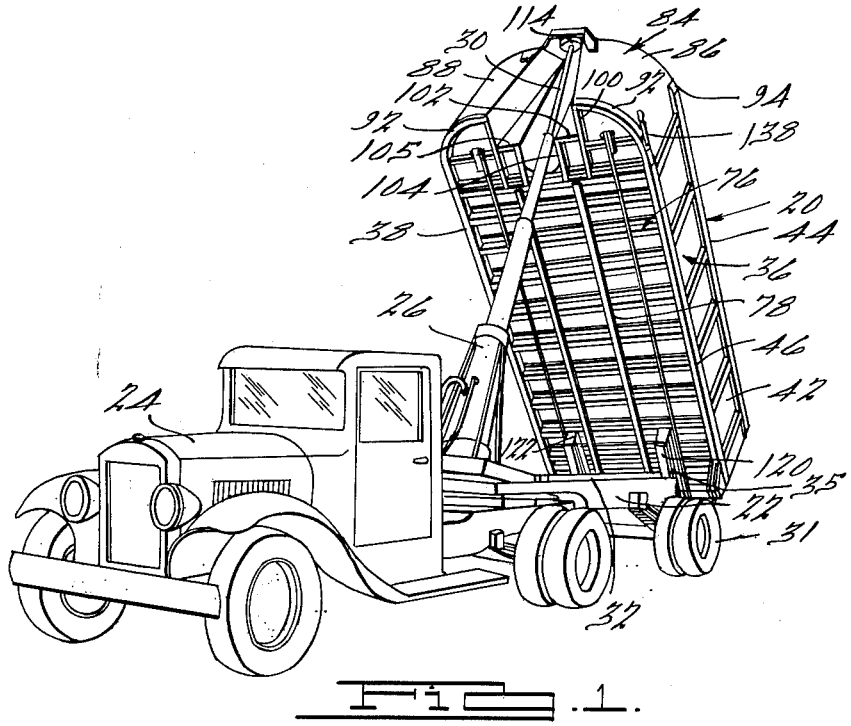
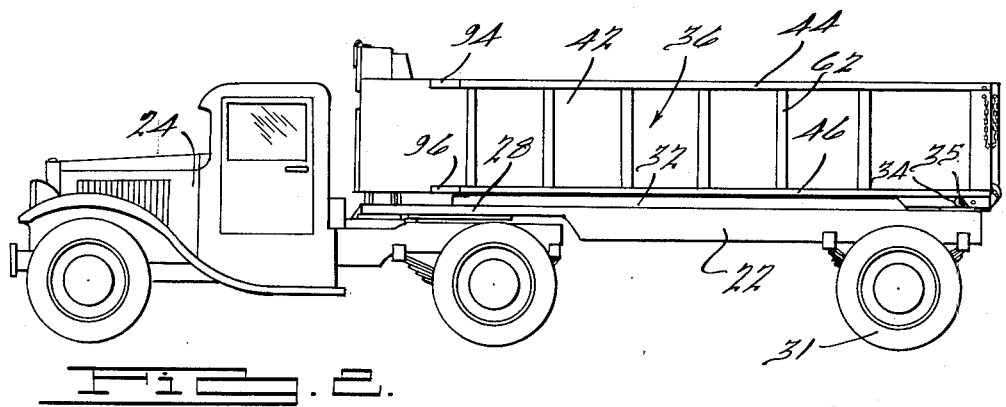
INVENTOR.
Joseph M. Gwinn, Jr.
BY
Harness, Dickey & Pierce
ATTORNEYS.

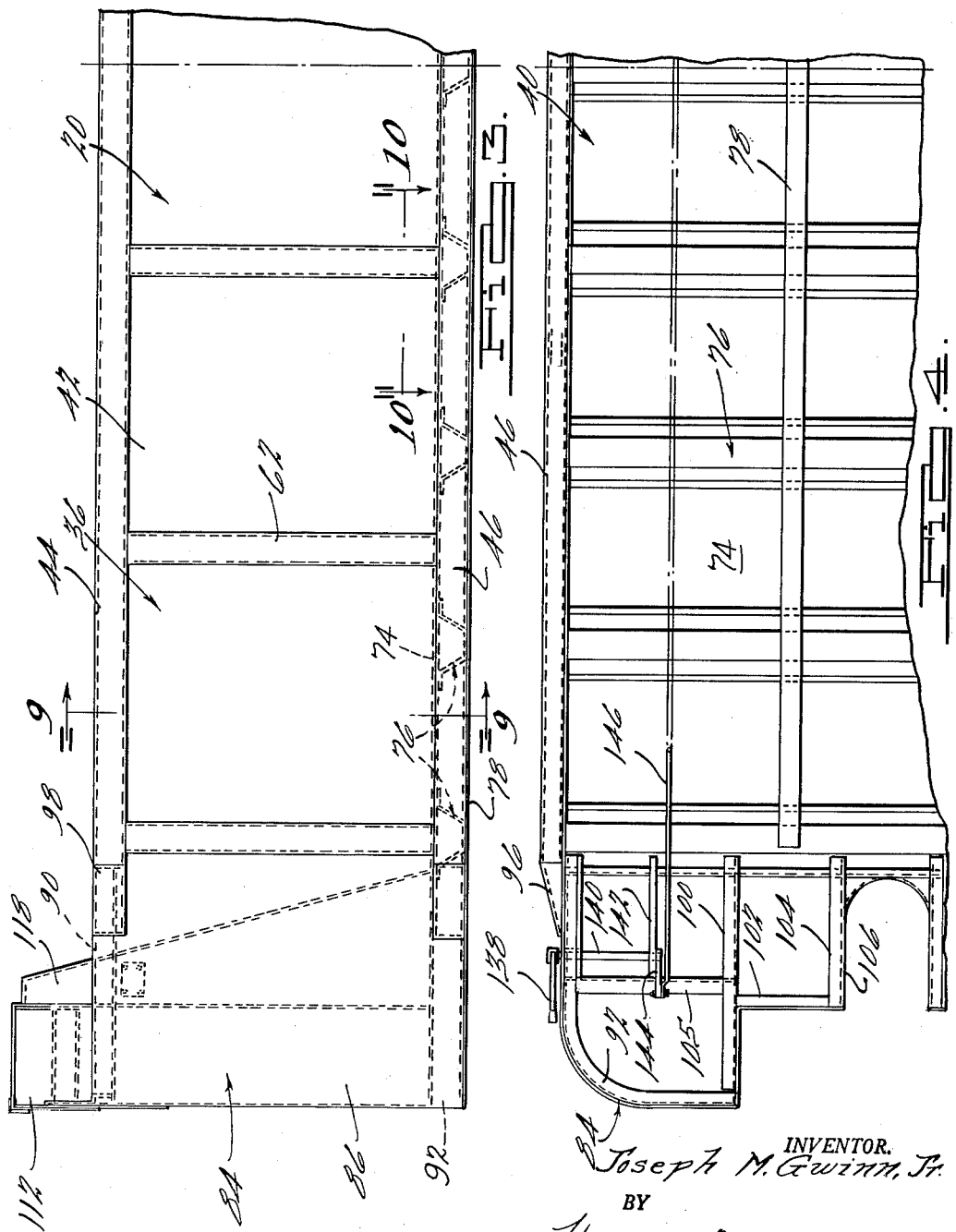

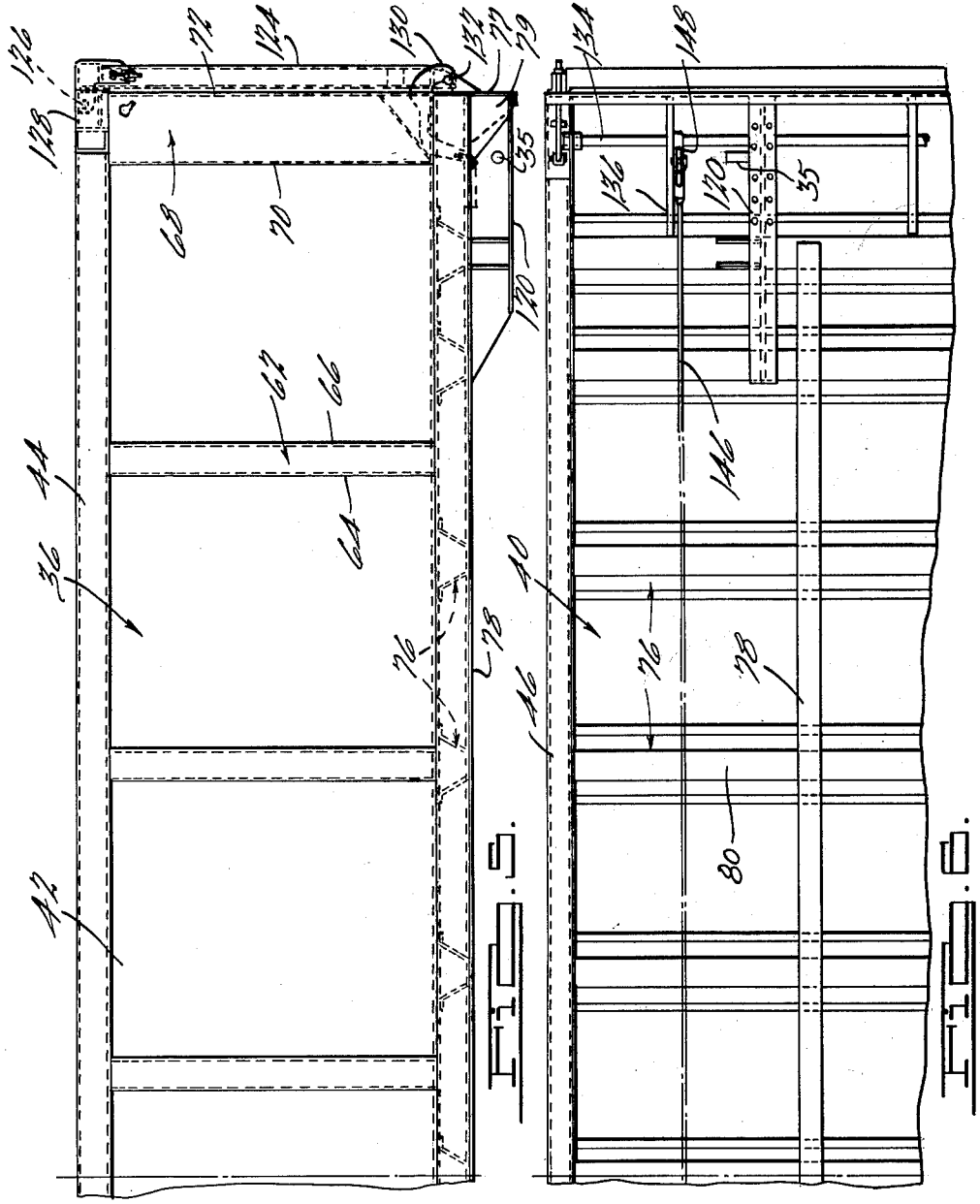

INVENTOR.
Joseph M. Gwinn, Jr.
BY
Harness, Dickey & Pierce
ATTORNEYS

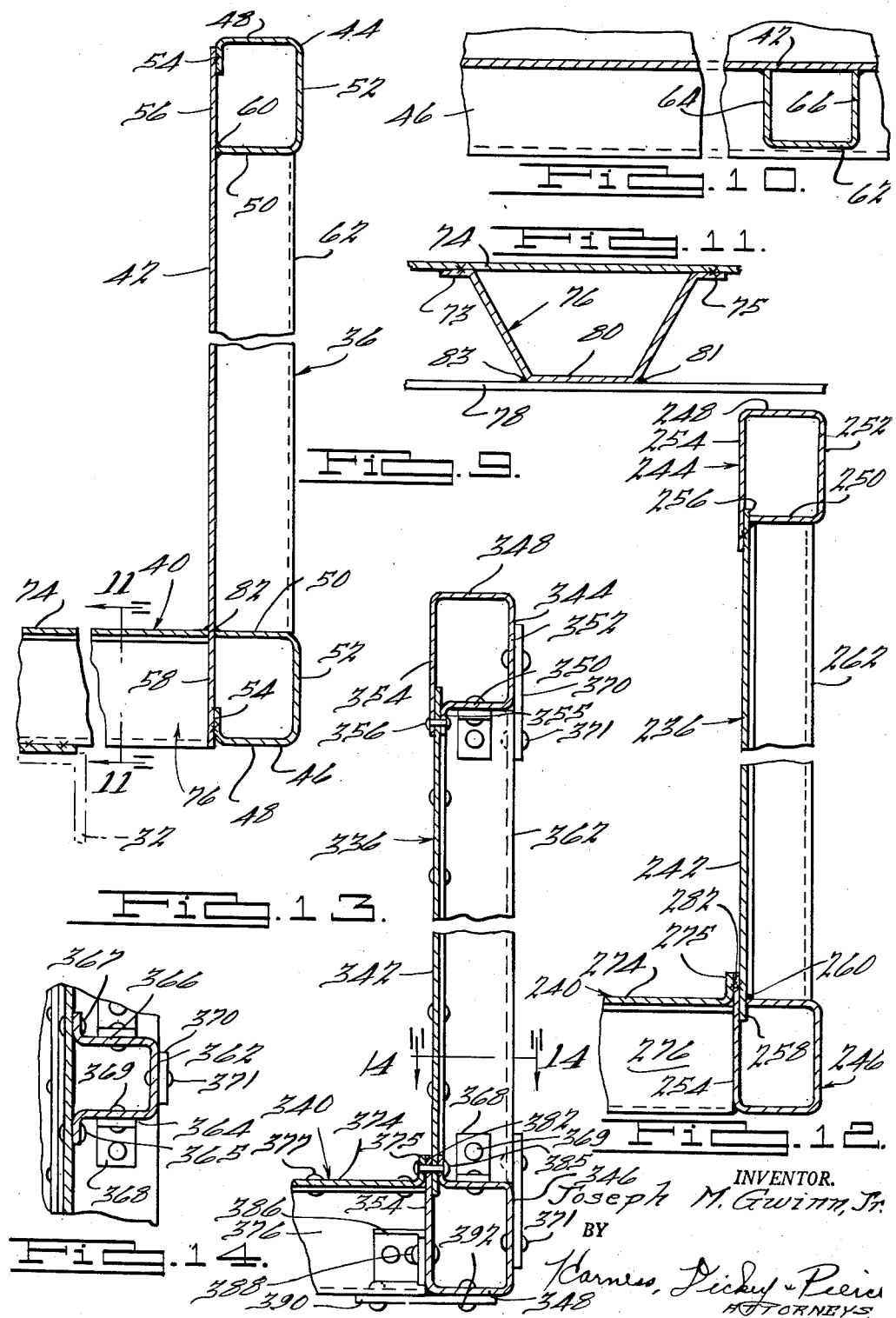

United States Patent Office 3,094,351
Patented June 18, 1963

3,094,351
DUMP TRUCK BODY
Joseph M. Gwinn, Jr., Dearborn, Mich., assignor to Gar Wood Industries, Inc., Wayne, Mich., a corporation of Michigan
Filed Apr. 30, 1956, Ser. No. 581,693
4 Claims. (Cl. 296—28)

This invention relates to vehicle bodies and more particularly to an improved dump body for use with dump trailers, dump trucks and the like.

An object of the invention is to overcome disadvantages in prior dump bodies of the indicated character and to provide an improved dump body incorporating improved means for imparting longitudinal stiffness and torsional rigidity to the body while at the same time reducing the weight thereof.

Another object of the invention is to provide an improved dump body which obviates the necessity of providing conventional longitudinal body channel members intermediate the side edges of the bottom of the body.

Another object of the invention is to provide an improved dump body that may be shipped in a knock-down position and easily and quickly assembled in the field.

Another object of the invention is to provide an improved dump body incorporating improved means for increasing the strength of the floor thereof.

Another object of the invention is to provide an improved dump body that is economical to manufacture and assemble, durable, efficient and reliable in operation.

Another object of the invention is to provide an improved dump body construction which may be manufactured with a minimum of metal-forming operations.

The above as well as other objects and advantages of the invention will become apparent from the following description, the appended claims and the accompanying drawings wherein:

FIGURE 1 is a perspective view of a dump body embodying the present invention showing the same installed on a trailer and in a raised or dumping position;

FIG. 2 is a side elevational view of the structure illustrated in FIG. 1 showing the body in a lowered position;

FIG. 3 is an enlarged side elevational view of the front portion of the body illustrated in FIGS. 1 and 2;

FIG. 4 is a bottom plan view of a portion of the structure illustrated in FIG. 3;

FIG. 5 is an enlarged side elevational view of the rear portion of the body illustrated in FIGS. 1 and 2;

FIG. 6 is a bottom plan view of a portion of the structure illustrated in FIG. 5;

FIG. 9 is a transverse sectional view of the portion of the structure illustrated in FIG. 3 taken on the line 9—9 thereof;

FIG. 10 is a sectional view of a portion of the structure illustrated in FIG. 3 taken on the line 10—10 thereof;

FIG. 11 is a sectional view of the portion of the structure illustrated in FIG. 9 taken on the line 11—11 thereof;

FIG. 12 is a sectional view similar to FIG. 9 and showing another embodiment of the invention;

FIG. 13 is a sectional view similar to FIG. 9 and showing still another embodiment of the invention;

FIG. 14 is a sectional view of the portion of the structure illustrated in FIG. 13 taken on the line 14—14 thereof.

Figure 7:
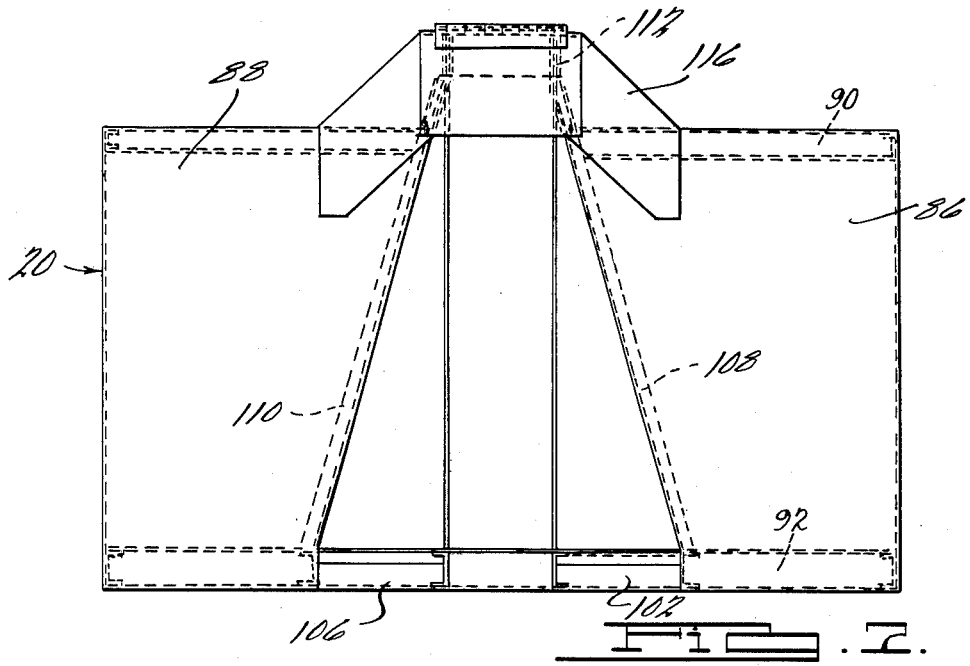
FIG. 7 is a front elevational view of the body illustrated in FIGS. 1 and 2.
Figure 8:
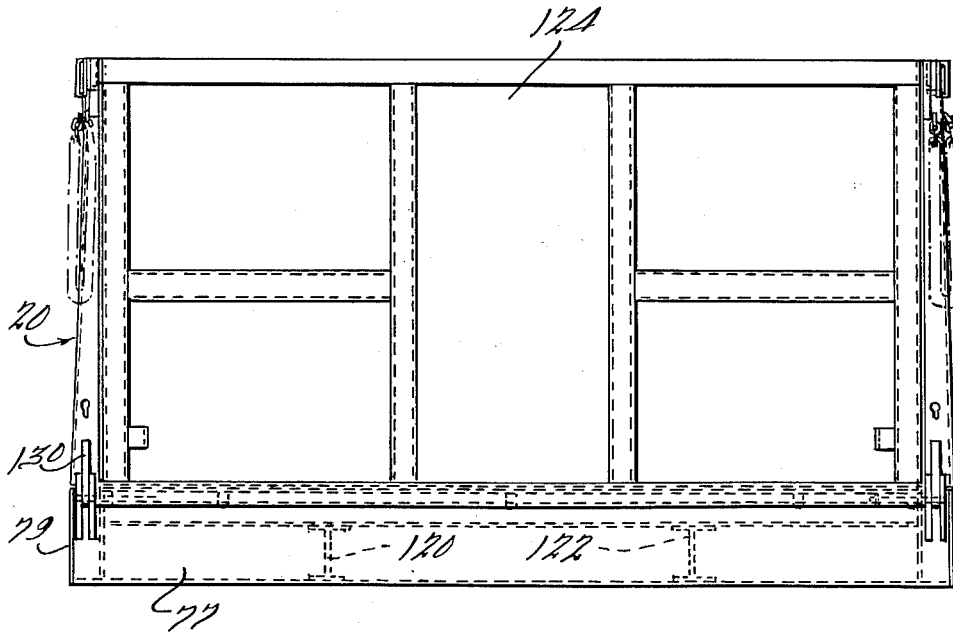
FIG. 8 is a rear elevational view of the body illustrated in FIGS. 1 and 2.

Referring to the drawings, the present invention is shown incorporated in a dump body, generally designated 20, particularly adapted for use with a trailer 22, although it will be understood that the present invention is also applicable to dump trucks as well as other uses. The trailer 22 is adapted to be pulled by a tractor 24, and the trailer is provided with a conventional hydraulic telescoping hoist 26, the lower end of which is fixed to the trailer chassis 28 while the terminating piston rod 30 of the hoist is pivotally connected to the dump body 20 as will be described hereinafter in greater detail. Trailers of the type illustrated also include ground-engaging wheels 31 upon which the chassis 28 is mounted. The trailer 22 may have a separately manufactured sub-frame 32 secured thereto, the sub-frame 32 having bearings 34 for pivotally receiving trunnions 35 provided on the body 20 at a position near, but spaced from, the rear end thereof.

The body 20 is comprised of a pair of spaced substantially parallel side members 36 and 38 and a floor member 40. Each of the side members 36 and 38 includes a substantially flat vertical sheet metal panel 42 which extends longitudinally of the body for substantially the entire length thereof. In order to impart torsional rigidity and longitudinal stiffness to the body 20, a pair of box-sectioned longitudinal rails 44 and 46 are provided on each of the side members 36 and 38, the rails 44 and 46 extending longitudinally along the upper and lower edge portions respectively of the side members with the rails 46 defining the lowermost boundaries of the side members. The rails 44 and 46 are substantially identical in construction except that the lower rail 46 is inverted with respect to the upper rail 44, and the rails may be made of rolled sections which extend substantially the full length of the body. As shown in FIG. 9, in this embodiment of the invention, each of the rails 44 and 46 includes spaced substantially parallel top and bottom wall portions 48 and 50 integrally joined by an outer wall portion 52 disposed in a plane substantially perpendicular to the planes of the top and bottom wall portions 48 and 50. Each of the rails 44 and 46 may also include an inner wall portion 54 which is integrally joined to the wall portion 48 and which is disposed in a plane substantially perpendicular to the plane of the wall portion 48, the inner wall portion 54 terminating in spaced relationship with respect to the wall portion 50 and facilitating the welding or riveting of the rails to the panels 42. In this embodiment of the invention, the inner wall portion 54 and the edge 60 of the wall portion 50 are welded to the upper and lower edge portions 56 and 58 of the sheet metal panels 42 so that the upper and lower edge portions 56 and 58 of the panels 42 together with the rails 44 and 46 form an integral closed box section having the desired rigidity and longitudinal stiffness. The closed box sections formed by the upper and lower rails 44 and 46 and the sections 56 and 58 of the panels 42 provide a maximum of torsional rigidity and longitudinal stiffness per unit of weight and constitute the major stiffening members of the entire body. Such a construction obviates the necessity of providing conventional longitudinal stiffening channels that are conventional secured to the floor of prior bodies of the indicated character. Such a construction also materially reduces the weight and cost of manufacturing and assembling the body.

In order to stiffen the side panels 42 and to make the upper and lower rails work together in torsion, a plurality of vertically extending generally channel-sectioned tie members 62 are provided, the flange portions 64 and 66 of which are welded to the sheet metal panels 42 and the ends of which are welded to the wall portions 50 of the longitudinally extending top and bottom rails. The tie members 62 together with the portions of the panels 62 intermediate the flange portions 64 and 66 form closed box sections thereby increasing the beam strength of the tie members, and in addition to stiffening the side panels, the tie members substantially prevent the side members 36 and 38 from twisting about a vertical axis relative to each other thereby increasing the torsional stiffness of the body. In order to strengthen the rear end portion of the body, a pair of generally channel-sectioned rear corner posts 68 are provided, the flange portions 70 and 72 of which are welded to the side panels 42 and the ends of which are welded to the wall portions 50 of the rails 44 and 46, the corner posts 68 together with the portions of the panels between the flanges 70 and 72 thereof forming closed box sections which function in substantially the same manner as the tie members.

The floor member 40 of the body is formed by a sheet metal plate 74 and the floor member is stiffened by a plurality of generally U-shaped cross pieces 76, the ends of which terminate in a vertical plane containing the side edges of the floor. The flange portions 73 and 75 of the cross pieces 76 are welded to the floor plate 74 so that the portions of the floor plate intermediate the flanges 77 and 79 together with the cross pieces 76 form closed box sections which increase the beam strength of the cross pieces. Such a construction also increases the number of lines of attachment to the floor plate 74 thereby increasing the strength of the floor. A rear apron 77 is also provided which is welded to the plate 74, gusset members 79 being provided to strengthen the assembly.

In order to relieve the cross pieces 76 from load concentrations, a pair of flat sheet metal strips 78 are provided which extend longitudinally of the body and which are welded to the web portions 80 of the cross pieces 76, as at 81 and 83. The strips 78 rest upon the sub-frame 32 or chassis frame member of the trailer 22, as the case may be, when the body 20 is in the lowered position illustrated in FIG. 2 and the strips 78 relieve the cross pieces 76 from load concentrations. The weld lines 81 and 83 serve to increase the strength of the corner portions of the cross pieces between the web 80 and the flange portions 73 and 75 of the cross pieces to prevent bending of the cross pieces.

The side members 36 and 38 and the floor member 40 are preferably made separately and may be shipped in a knocked-down condition and thereafter assembled in the field. In any case, on assembly of the side members 36 and 38 and the floor member 40, the edges 82 of the floor plate 74 and the ends of the cross pieces 76 are welded to the sheet metal panels 42, all of these surfaces lying in a common plane. This greatly facilitates the welding of the side members 36 and 38 and the floor member 40 together and thus makes possible the shipping of the body in a knocked-down condition for assembly in the field. Since the cross pieces 76 are secured to the floor plate so as to form closed box sections, the cross pieces substantially prevent the side members 36 and 38 from twisting about an axis transverse of the body thereby materially increasing the torsional stiffness of the body.

Considering the above-described construction, it will be noted that the longitudinal rails 44 and 46 are identical and that the rails 44 and 46 together with the channels 62 and 68 and the cross pieces 76 are of such form that they may be produced in any desired length by conventional rolling operations thus greatly reducing the fabricating costs which would otherwise be incident to metalforming operations. Furthermore the panels 42 and the bottom plate 74 are flat with the result that no special forming operations are necessary in that portion of the body heretofore described.

The front portion of the body is closed by a conventional round nose and hoist housing assembly, generally designated 84, which is comprised of a pair of curved front end panels 86 and 88. The end panels 86 and 88 are welded or otherwise secured to a pair of curved generally channel-shaped top end rails 90 and a pair of curved generally channel-shaped bottom end rails 92. The top end rails 90 are disposed at substantially the same elevation as the longitudinally extending rails 44 and the bottom end rails 92 are disposed at substantially the same elevation as the lower longitudinally extending rails 46. The top front end rails 90 are welded to generally wedge-shaped channel end members 94 which in turn are welded to the top longitudinally extending rails 44. Similarly, the bottom end rails 92 are welded to generally wedge-shaped channel end members 96, the channel end members 96 in turn being welded to the lower longitudinally extending rails 46. Suitable finishing plates such as 98 are also welded to the channel end members 94 and 96.

As shown in FIGS. 1 and 4, a plurality of front-framing members 100, 102, 104 and 105 are provided on opposite sides of the longitudinal axis of the body 20, the framing members 100, 102 and 104 defining a generally step-shaped recess 106 which is open at the front and at the bottom of the body and which is adapted to accommodate the telescoping hydraulic hoist assembly 26 carried by the trailer chassis. As shown in FIG. 4, the framing members and the bottom end rails 92 are welded to the floor plate 74, and the framing members 100 and 105 are welded to each other and to the bottom front end rail 92 while the framing member 102 is welded to the framing members 100 and 104. As shown in FIG. 7, diagonally extending front framing members 108 and 110 are provided which are welded to the upper and lower front end rails 90 and 92 and to bearing members 112 to which the upper end of the terminating piston rod 30 of the hoist is pivotally connected, as at 114. Gusset plates 116 are provided between the bearing members 112 and the front panels 86 and 88 and a housing 118 is also provided which serves to enclose the framing members 108 and 110 and to close the front of the body intermediate the front end panels 86 and 88.

As shown in FIGS. 1, 5 and 6, a pair of rear hinge support beams 120 and 122 are provided which carry the trunnions 35 that serve to pivotally connect the body 20 to the sub-frame 32. The beams 120 and 122 serve to distribute the pivoting loads over the rear end portion of the body. Similar beams may be utilized to distribute the load over the central portion of the body in the event a conventional underbody hoist is utilized.

The rear end of the body is closed by a tailgate 124, the upper end portion of which is pivotally connected by hinge members 126 to hinge brackets 128 fixed to the upper longitudinally extending rails 44. The lower end portion of the tailgate 124 is releasably secured to the body by a pair of latch members 130 which releasably engage pins 132 carried by the tailgate. In the embodiment of the invention illustrated, the latch members 130 are fixed to a transversely extending shaft 134 journaled for oscillation in bearing plates 136 secured to the bottom of the floor plate 74. In order to facilitate the latching and unlatching of the tailgate from the front of the body, a control handle 138 is provided which is fixed to a shaft 140 journaled for oscillation in bearing plates 142 secured to the bottom of the floor plate 74 at a position adjacent the front of the body. A link arm 144 is provided, one end portion of which is fixed to the shaft 140 while the opposite end portion of the link arm 144 is pivotally connected to one end of a control rod 146 which extends longitudinally of the body beneath the floor. The opposite end of the rod 146 is pivotally connected to one end of a link arm 148 and the opposite end of the link arm 148 is fixed to the shaft 134 which carries the latch members 130. With such a construction, angular movement of the handle 138 in one direction effects a longitudinal movement of the rod 146 so as to pivot the latch members 130 to release the tailgate and angular movement of the handle 138 in the opposite direction effects a longitudinal movement of the rod 146 to pivot the latch members into latching relationship with the pins 132 when the tailgate is closed.

In the operation of the body, when the telescoping hydraulic hoist 26 is actuated so as to raise the piston rod 30, the front of the body 20 is elevated while the rear end portion of the body pivots about the axes of the trunnions 35. When the piston rod 30 of the telescoping hoist is lowered, the body 20 is returned to the position shown in FIG. 2. It will be noted that the hoist housing assembly 84 forms a closure for the telescoping hoist 26 when the body is in the lowered position and that the recess 106 permits angular movement of the body relative to the piston rod 30 of the hoist during the raising and lowering operations.

Another embodiment of the invention is illustrated in FIG. 12. In this embodiment of the invention, the body is comprised of a pair of spaced substantially parallel side members 236 and a floor member 240. Each of the side members 236 includes a substantially flat vertical sheet metal panel 242 which extends longitudinally of the body for substantially the entire length thereof. In order to impart torsional rigidity and longitudinal stiffness to the body, a pair of closed box-sectioned longitudinal rails 244 and 246 are provided on each of the side members, the rails 244 and 246 extending longitudinally along the upper and lower edge portions of the panels 242 with the rails 246 defining the lower-most boundaries of the side members. The rails 244 and 246 are substantially identical in construction except that the lower rail 246 is inverted with respect to the upper rail 244 and the rails may be made of rolled sections which extend substantially the full length of the body.

In this embodiment of the invention, each of the rails 244 and 246 include spaced substantially parallel top and bottom wall portions 248 and 250 integrally joined by an outer wall portion 252 which is disposed in a plane substantially perpendicular to the planes of the top and bottom wall portions 248 and 250. Each of the rails 244 and 246 also includes an inner wall portion 254 which is integrally joined to the wall portion 248 and which is disposed in a plane substantially perpendicular to the plane of the wall portion 248, the inner wall portion 254 extending past the wall portion 250 and terminating in outwardly spaced relationship with respect to the wall portion 250. In this embodiment of the invention, the upper and lower edge portions 256 and 258 of the sheet metal panels 242 are inserted between the inner wall portion 254 and the edge 260 of the wall portion 250 and welded to the inner wall portion 254 and the edge 260 of the wall portion 250 so as to form an integral closed box section having the desired rigidity and longitudinal stiffness. The closed box sectioned upper and lower rails provide a maximum of torsional rigidity and longitudinal stiffness per unit of weight and constitute the major stiffening members of the entire body thereby obviating the necessity of providing conventional longitudinal stiffening channels such as are conventionally provided on the floor of prior bodies.

In order to stiffen the side panels 242 and to make the upper and lower rails work together in torsion, a plurality of vertically extending channel sectioned tie members 262 are provided, the flange portions of which are welded to the sheet metal panels 242 and the ends of which are welded to the wall portions 250 of the longitudinally extending top and bottom rails. The tie members 262 together with the portions of the panels 242 intermediate the flange portions of the tie members 262 form closed box sections thereby increasing the beam strength of the tie members and the strength of the panels. The tie members also substantially prevent the side members of the body from twisting about a vertical axis relative to each other thereby increasing the torsional stiffness of the body.

The floor member 240 of the body is formed by a sheet metal plate 274 having upturned flanges 275 at the side edges thereof. The floor member 240 is stiffened by a plurality of generally U-shaped cross pieces 276, the ends of which terminate in a vertical plane containing the outer sides of the flanges 275. The cross pieces 276 are welded to the floor plate 274 so as to form closed box sections which increase the strength of the floor plate and the beam strength of the cross pieces.

In order to relieve the cross pieces 276 from load concentrations, the pairs of flat sheet metal strips 78 are welded to the web portions of the cross pieces 276 in the manner previously described, the strips resting upon the sub-frame or chassis frame member of the trailer as the case may be when the body is in the lowered position, thereby relieving the cross pieces 276 from load concentrations.

In this embodiment of the invention, the side members 236 and the floor member 240 may be shipped in a knocked-down condition if desired and thereafter assembled in the field. In any case, on assembly of the side members and the floor member, the side edges 282 of the flanges 275 on the floor plate 274 and the ends of the cross pieces 276 are welded to the inner wall 254 of the lower rail 246, all of these surfaces lying in a common plane. This greatly facilitates the welding of the side members and the floor member together and thus makes possible the shipping of the body in a knocked-down condition for assembly in the field. When the ends of the cross pieces are fixed to the lower rails 246, the cross pieces substantially prevent the side members of the body from twisting about an axis transverse of the body thereby materially increasing the torsional stiffness of the body.

Considering the above-described construction, it will be noted that the longitudinal rails 244 and 246 are identical and that the rails 244 and 246 together with the channels 262 and the cross pieces 276 are of such form that they may be produced in any desired length by conventional rolling operations thus greatly reducing the fabricating costs which would otherwise be incident to metal forming operations. Furthermore, the panels 242 are flat and the only forming operation necessary in that portion of the body described is that of forming the flanges 275 on the bottom plate 274. The remaining portions of the body may be constructed in a manner similar to that described in connection with the embodiment of the invention illustrated in FIGS. 1 through 11.

Another embodiment of the invention is illustrated in FIGS. 13 and 14 particularly adapted for use with bodies formed of aluminum or other material that is not readily welded. In this embodiment of the invention, the body is comprised of a pair of spaced substantially parallel side members 336 and a floor member 340. In this embodiment of the invention, each of the side members 336 includes a substantially flat sheet metal panel 342 which extends longitudinally of the body for substantially the entire length thereof. In order to impart torsional rigidity and longitudinal stiffness to the body, a pair of closed box sectioned longitudinal rails 344 and 346 are provided on each of the panels 342, the rails 344 and 346 extending longitudinally along the upper and lower edge portions respectively of the panels 342 with the rails 346 defining the lowermost boundaries of the side members. The rails 344 and 346 are also substantially identical in construction except that the lower rail 346 is inverted with respect to the upper rail 344 and the rails may be made of rolled sections which extend substantially the full length of the body.

As shown in FIG. 13, in this embodiment of the invention, each of the rails 344 and 346 includes spaced substantially parallel top and bottom wall portions 348 and 350 integrally joined by an outer wall portion 352 disposed in a plane substantially perpendicular to the planes of the top and bottom wall portions 348 and 350. Each of the rails 344 and 346 also includes an inner wall portion 354 which is integrally joined to the wall portion 348 and which is disposed in a plane substantially perpendicular to the plane of the wall portion 348. The inner wall portion 354 terminates in outwardly spaced relationship with respect to the wall portion 350, and a flange 355 is provided on the wall portion 350, the flange 355 being disposed in spaced substantially parallel relationship with respect to the free edge portion of the inner wall 354. Such a construction facilitates riveting the rails to the panels 342. In this embodiment of the invention, the upper and lower edge portions of the panels 342 are inserted between the inner wall portion 354 and the flange 355 of the rails and riveted thereto by rivets 356 so that the rails form integral closed box sections having the desired rigidity and longitudinal stiffness. The closed box sectioned upper and lower rails provide a maximum of torsional rigidity and longitudinal stiffness per unit of weight and constitute the major stiffening members of the entire body. This embodiment of the invention also obviates the necessity of providing conventional longitudinal stiffening channels such as are conventionally secured to the floor of prior bodies intermediate the side edges thereof.

In order to stiffen the side panels 342 and to make the upper and lower rails work together in torsion, a plurality of vertically extending generally channel sectioned tie members 362 are provided, the flange portions 364 and 366 of which are provided with out-turned portions 365 and 367 which are riveted to the sheet metal panels 342. The ends of the tie members are riveted to the wall portions 350 of the longitudinally extending top and bottom rails through the agency of clip angles 368 and rivets 369. Gusset plates 370 are also preferably riveted to the web portions of the tie members and the outer walls of the rails by rivets 371.

The tie members 362 and the portions of the panels between the flange portions of the tie members thus form closed box sections, and the tie members substantially prevent twisting of the side members of the body about a vertical axis thereby increasing the torsional stiffness of the body in the manner previously described.

The floor member 340 is formed by a sheet metal plate 374 having upturned flanges 375 at the side edges thereof. The floor member is stiffened by a plurality of generally U-shaped cross pieces 376, the ends of which terminate in a vertical plane containing the outer edges of the flanges 375. The flanges of the cross pieces are riveted to the floor plate 374 by rivets 377 to form closed box sections which increase the strength of the floor plate and the beam strength of the cross pieces.

In order to relieve the cross pieces 376 from load concentrations, fitted sheet metal strips may be riveted or otherwise fixed to the cross pieces 376 so that the strips rest upon the sub-frame or chassis frame member of the trailer when the body is in the lowered position to prevent failure of the cross pieces 376 under heavy load concentrations.

The side members 336 and the floor member 340 may also be shipped in a knocked-down condition and thereafter assembled in the field. In any case, on assembly of the members 336 and 340, the side edges 382 of the flanges 375 on the floor plate 374 are riveted to the lower rails 346 by rivets 385 which extend through the flanges 375, the inner wall portion 354 and the flange 355 of the rail. The ends of the cross pieces 376 are riveted to the inner wall portion 354 of the rail by angle plates 386 and rivets 388 which may for example be blind rivets. Gusset plates 390 are also preferably riveted to the cross pieces 376 and the wall 348 of the lower rail 346 by rivets 392 which may also be blind rivets.

Considering the above-described construction, it will be noted that the longitudinal rails 344 and 346 are identical and that the rails 344 and 346 together with the channels 362 and the cross pieces 376 are of such form that they may be produced in any desired length by conventional rolling operations thus reducing the fabricating costs which would otherwise be incident to metal forming operations.

Furthermore, the panels 342 are flat and the angle plates 386 and the gusset plate 390 may be conventional structural shapes with the result that the only forming operation necessary is that of forming the flanges 375 on the bottom plate 374. The cross pieces substantially prevent the side members of the body from twisting about an axis transverse of the body thereby materially increasing the torsional stiffness of the body. The remaining portion of the body may be constructed in a manner similar to that described in connection with the embodiment of the invention illustrated in FIGS. 1 through 11.

While preferred embodiments of the invention have been shown and described, it will be understood that various changes and modifications may be made without departing from the spirit of the invention.

What is claimed is:

1. A vehicle dump body comprising a floor member and a pair of spaced substantially parallel side members secured to the opposite sides of said floor member, each of said side members including a substantially flat vertically extending panel, a pair of rails secured to the longitudinal edge portions of each of said panels, each of said rails including spaced top and bottom wall portions integrally joined by an outer wall portion, said rails being secured to said panels to form box sections closed in transverse cross section, a plurality of vertically extending tie members spaced longitudinally of said rails, the opposite end portions of said tie members being fixed to said rails, said floor member including a floor plate and a plurality of cross pieces fixed to said plate with the ends of said cross pieces terminating in vertical planes containing the side edges of said plate, said floor plate and said cross pieces being fixed to each of said side members.

2. A vehicle dump body comprising a floor member and a pair of spaced substantially parallel side members secured to the opposite sides of said floor member, each of said side members including a substantially flat vertically extending panel, a pair of rails secured to the longitudinal edge portions of each of said panels, each of said rails including spaced top and bottom wall portions integrally joined by an outer wall portion, said rails being secured to said panels to form box sections closed in transverse cross section, a plurality of vertically extending tie members fixed to said panels in spaced relationship longitudinally therealong, the opposite end portions of said tie members being fixed to said rails, said floor member including a floor plate and a plurality of cross pieces fixed to said plate with the ends of said cross pieces terminating in vertical planes containing the side edges of said plate, said floor plate and said cross pieces being fixed to each of said side members, and a pair of substantially flat strips extending longitudinally of said body and being fixed to said cross pieces in spaced relationship to said floor member.

3. A vehicle dump body comprising a floor member and a pair of spaced substantially parallel side members secured to the opposite sides of said floor member, each of said side members including a substantially flat vertically extending panel, a pair of rails secured to the longitudinal edge portions of each of said panels, each of said rails including spaced top and bottom wall portions integrally joined by an outer wall portion, said rails being secured to said panels to form box sections closed in transverse cross section, a plurality of vertically extending tie members spaced longitudinally of said panels and fixed thereto to form box sections closed in transverse cross section, the opposite end portions of said tie members being fixed to said rails, said floor member including a floor plate and a plurality of cross pieces fixed to said plate to form box sections closed in transverse cross section, the ends of said cross pieces terminating in vertical planes containing the side edges of said plate, said floor plate and said cross pieces being fixed to each of said side members.

4. In combination with a vehicle frame, a vehicle dump body comprising a floor member and a pair of spaced substantially parallel side members secured to the opposite sides of said floor member, each of said side members including a substantially flat vertically extending panel, a pair of rails secured to the longitudinal edge portions of each of said panels, each of said rails including spaced top and bottom wall portions integrally joined by an outer wall portion, said rails being fixed to said panels to form closed box sections, a plurality of vertically extending tie members fixed to said panels in spaced relationship longitudinally thereof, the opposite end portions of said tie members being fixed to said rails, said floor member including a floor plate and a plurality of cross pieces fixed to said plate with the ends of said cross pieces terminating in vertical planes containing the side edges of said plate, the ends of said cross pieces and the side edges of said plate being fixed to said side members, each of said cross pieces having a web portion disposed in spaced relationship with respect to said plate, a plurality of substantially flat strips extending longitudinally of said body and fixed to the web portion of each of said cross pieces, said strips being adapted to rest on said frame when said body is in a lowered position, a pair of support beams fixed to said plate and projecting downwardly therefrom, and means pivotally connecting said beams to said frame.

References Cited in the file of this patent

UNITED STATES PATENTS

| | | |
|---|---|---|
| 1,139,456 | Ledwinka | May 11, 1915 |
| 1,139,457 | Ledwinka | May 11, 1915 |
| 1,675,317 | Burke | July 3, 1928 |
| 2,275,349 | Collender | Mar. 3, 1942 |
| 2,486,381 | Bauer et al. | Nov. 1, 1949 |
| 2,595,028 | Vutz | Apr. 29, 1952 |
| 2,694,599 | Porter et al. | Nov. 16, 1954 |

OTHER REFERENCES

The Heil Co., Catalog No. 140 of 1924, Milwaukee, Wis., page 6, Heil SSC No. 11 Steel Dump Body.